United States Patent
Lutz et al.

(10) Patent No.: US 9,658,827 B2
(45) Date of Patent: May 23, 2017

(54) APPARATUS AND METHOD FOR PERFORMING RECIPROCAL ESTIMATION OPERATION

(71) Applicant: ARM LIMITED, Cambridge (GB)

(72) Inventors: David Raymond Lutz, Austin, TX (US); Neil Burgess, Austin, TX (US)

(73) Assignee: ARM Limited, Cambridge (GB)

( * ) Notice: Subject to any disclaimer, the term of this patent is extended or adjusted under 35 U.S.C. 154(b) by 242 days.

(21) Appl. No.: 14/519,787

(22) Filed: Oct. 21, 2014

(65) Prior Publication Data

US 2016/0110161 A1    Apr. 21, 2016

(51) Int. Cl.
  G06F 7/483    (2006.01)
  G06F 7/485    (2006.01)
  G06F 7/535    (2006.01)
  G06F 7/552    (2006.01)
  G06F 7/57     (2006.01)

(52) U.S. Cl.
  CPC ............. *G06F 7/485* (2013.01); *G06F 7/483* (2013.01); *G06F 7/535* (2013.01); *G06F 7/5525* (2013.01); *G06F 7/57* (2013.01); *G06F 2207/48* (2013.01); *G06F 2207/5356* (2013.01)

(58) Field of Classification Search
  CPC ......... G06F 2101/12; G06F 2207/5356; G06F 2207/5221
  See application file for complete search history.

(56) References Cited

U.S. PATENT DOCUMENTS

| | | | | |
|---|---|---|---|---|
| 5,153,851 A * | 10/1992 | Kanazawa | .............. | G06F 7/535 708/205 |
| 5,923,577 A * | 7/1999 | Wong | ..................... | G06F 1/035 708/501 |
| 5,973,705 A * | 10/1999 | Narayanaswami | ..... | G06F 7/535 345/505 |
| 6,169,554 B1 * | 1/2001 | Deering | .................. | G06T 15/30 715/764 |
| 6,732,134 B1 * | 5/2004 | Rosenberg | .............. | G06F 7/499 708/495 |
| 2004/0093367 A1 * | 5/2004 | Shearer | ................. | G06F 7/4873 708/502 |

* cited by examiner

*Primary Examiner* — Chuong D Ngo
(74) *Attorney, Agent, or Firm* — Nixon & Vanderhye P.C.

(57) ABSTRACT

A data processing apparatus has floating-point add circuitry for performing a floating-point add operation for adding or subtracting two floating-point operands. The apparatus also has reciprocal estimation circuitry for performing a reciprocal estimation operation on a first operand to generate a reciprocal estimate value which represents an estimate of a reciprocal of a first operand or an estimate or a reciprocal of the square root of the first operand. The reciprocal estimation circuitry is physically distinct from the floating-point adder circuitry, which allows both the reciprocal estimate and the add operations to be faster.

17 Claims, 7 Drawing Sheets

APPARATUS AND METHOD FOR PERFORMING RECIPROCAL ESTIMATION OPERATION

TECHNICAL BACKGROUND

Technical Field

The present technique relates to the field of data processing. More particularly, it relates to generating an estimate of the reciprocal of an operand or reciprocal of the square root of an operand.

Background

There are a number of data processing operations for which it is useful to provide, as a starting point, an estimate of a reciprocal of an operand, or an estimate of a reciprocal of the square root of the operand. For example, the Newton-Raphson method for division may use an estimate of the reciprocal of the divisor as its starting point. Also, when calculating the actual reciprocal or reciprocal of the square root of an operand, an iterative process such as the Newton-Raphson method may yield the result faster if starting with an estimate of the reciprocal or the reciprocal square root. Therefore, providing a reciprocal estimation operation for generating reciprocal estimates and reciprocal square root estimates is useful for a range of operations. Sometimes, the reciprocal estimate may be useful in its own right—e.g. if the full precision of the full reciprocal operation is not required, then the reciprocal estimate can provide a faster result. The present technique seeks to provide improved circuitry for performing the reciprocal estimation operation.

SUMMARY

Viewed from one aspect, the present technique provides a data processing apparatus comprising:
  floating-point add circuitry to perform a floating-point addition operation for adding or subtracting two floating-point operands to generate a result floating-point operand; and
  reciprocal estimation circuitry to perform a reciprocal estimation operation on a first operand to generate a reciprocal estimate value representing an estimate of a reciprocal of the first operand or an estimate of a reciprocal of the square root of the first operand;
  wherein the reciprocal estimation circuitry is physically distinct from the floating-point add circuitry.

Viewed from another aspect, the present technique provides a data processing apparatus comprising:
  floating-point adding means for performing a floating-point addition operation for adding or subtracting two floating-point operands to generate a result floating-point operand; and
  reciprocal estimation means for performing a reciprocal estimation operation on a first operand to generate a reciprocal estimate value representing an estimate of a reciprocal of the first operand or an estimate of a reciprocal of the square root of the first operand;
  wherein the reciprocal estimation means is physically distinct from the floating-point adding means.

Viewed from a further aspect, the present technique provides a data processing method comprising:
  performing a reciprocal estimation operation on a first operand to generate a reciprocal estimate value representing an estimate of a reciprocal of the first operand or an estimate of a reciprocal of the square root of the first operand;
  wherein the reciprocal estimation operation is performed using reciprocal estimation circuitry which is physically distinct from floating-point add circuitry for performing a floating-point addition operation for adding or subtracting two floating-point operands to generate a result floating-point operand.

The above, and other objects, features and advantages of this invention will be apparent from the following detailed description of illustrative embodiments which is to be read in connection with the accompanying drawings.

DESCRIPTION OF EXAMPLE EMBODIMENTS

The term "reciprocal estimate" is used in the subsequent description to refer to an estimate of the reciprocal of an operand (1/x) or an estimate of the reciprocal square root of the operand (1/√x). The term "recip estimate" is used to refer to the estimate of the reciprocal of the operand (1/x), and the term "rsqrt estimate" is used to refer to the estimate of the reciprocal of the square root of the operand (1/√x). Hence, unless otherwise specified, "reciprocal estimate", "reciprocal estimation operation" etc. refers to any of these types of estimate. While both recip estimate and rsqrt estimate are described in this application, it will be appreciated that some embodiments may support only one of these types of estimate.

Reciprocal estimation operations are typically carried out within a floating-point add unit for performing a floating-point addition operation for adding or subtracting two-point operands to generate a result floating point operand. However, combining the floating-point addition operation and reciprocal estimation operation in a single unit slows down both the addition operation and the reciprocal estimation operation, because in practice the steps for performing the reciprocal estimation operation do not fit well with the steps for the addition operation, so that a pipeline for performing both includes a greater number of stages than a pipeline for performing either operation individually. By providing standalone reciprocal estimation circuitry which is physically distinct from the floating-point circuitry, both the floating-point add circuitry and reciprocal estimation circuitry can be faster. For example, rather than requiring four cycles to perform either the add or the reciprocal estimate using a combined unit, with a present technique the adder may be reduced to three processing cycles while the reciprocal estimate may be performed in two processing cycles. This can provide a significant performance improvement.

The reciprocal estimate may require fewer cycles than the floating-point add. The add operation may be longer because the floating-point add circuitry may require several steps to align the operand being added or subtracted, then add the aligned operands, and then normalize and round the result. In previous combined implementations, the reciprocal estimate would be penalized because the reciprocal estimate would have to take as many cycles as the add. This can be avoided by providing a physically distinct reciprocal estimate dedicated to performing the reciprocal estimate operation.

The first operand for the reciprocal operation may be either a fixed-point operand (including integer operands) or a floating-point operand. The reciprocal estimation circuitry may be capable of performing the reciprocal estimation operation on both fixed-point operands and floating-point operands, and for floating-point operands on both normal and subnormal values. This allows the reciprocal estimate to be generated across a wider range of floating-point values.

The reciprocal estimation circuitry may comprise significand processing circuitry for generating a significand of the reciprocal estimate value. For fixed-point operands, the significand is enough. For floating-point operands, an exponent may also be generated by exponent generating circuitry.

The significand processing circuitry may have lookup operand generating circuitry for generating a lookup operand based on the significand of the first operand, and a lookup table which can be looked up using the lookup operand to map the lookup operand to a significand of the reciprocal estimate value. The table provides a faster estimate of the reciprocal than can be provided in an iterative process such as Newton-Raphson. In some examples, separate lookup tables may be provided for the recip estimate and rsqrt estimate respectively.

The lookup operand may be formed in different ways depending on the type of reciprocal estimate being performed, whether the first operand is a fixed-point or floating-point value, and/or whether the floating-point value is normal or subnormal. Hence, the lookup operand generating circuitry may provide various formatting operations to generate an appropriate operand for looking up the table. For example, when calculating the rsqrt estimate, it may be desirable to lookup a value which corresponds to an even-numbered exponent so that the exponent processing is simplified (this allows the exponent generating circuitry to generate the new exponent by halving the exponent of the first operand).

Therefore, the lookup operand generating circuitry may shift the first operand if necessary to ensure an even-numbered exponent. Also, the lookup operand generating circuitry may comprise normalization circuitry for normalizing the significand of the first operand, if the first operand is subnormal value. This allows the reciprocal estimation circuitry to handle subnormal operands. For rsqrt operations, there may also be some additional computation to compute parts of the lookup operand, depending on the bits of the significand of the first operand.

For generating the floating-point exponent, different operations may be required for recip estimates and rsqrt estimates. Some implementations may provide separate circuits for generating the recip estimate exponent and the rsqrt estimate exponent. In other embodiments, at least some of the exponent generating circuitry may be shared between the recip and rsqrt calculations, to reduce circuit area.

More particularly, for recip estimate calculations, a biased exponent $e'_R$ of the reciprocal estimate value can be calculated with a value equivalent to:

$$e'_R = \sim e'_{op} + 2*B - 1 + lzc + \text{normal}$$

where $\sim e'$, is an inverted version of a biased exponent $e'$, of the first operand;

B is an exponent bias amount (which may depend on the floating-point representation being used);

lzc represents a number of leading zeroes in a significand of the first operand if the first operand is subnormal; and normal equals 1 if the first operand is normal and equals 0 if the first operand is subnormal.

Similarly, for rsqrt estimate calculations, the biased exponent $e'_R$ of the reciprocal estimate value may be calculated with a value equivalent to:

$$e'_R = B + \frac{B-1}{2} - 1 + \text{normal} + \sim\frac{e'_{op}}{2} + \sim e'_{op}[0] + \frac{lzc}{2} + lzc[0];$$

where:

$$\sim \frac{e'_{op}}{2}$$

is an inverted version of half a biased exponent $e'$, of the first operand;

$e'_{op}[0]$ is an inverted version of a least significant bit of the biased exponent $e'_{op}$ of the first operand;

B is an exponent bias amount (which may depend on the floating-point representation being used);

lzc represents a number of leading zeroes in a significand of the first operand if the first operand is subnormal;

lzc[0] is a least significant bit of lzc; and normal equals 1 if the first operand is normal and equals 0 if the first operand is subnormal.

Note that the exponent generating circuitry only needs to generate a value equivalent to the result of the equations shown above—it may not necessarily perform the exact sequence of additions/subtractions shown, as there may be other operations which may generate an equivalent result.

While these formulae may seem relatively complex, in practice they can be implemented relatively efficiently in circuitry using a carry-save adder and a second adder. In both the recip and rsqrt estimate operations, a 3:2 carry-save adder may generate sum and carry values by adding:

an inverted exponent value (dependent on an inverted version of the exponent of the first operand), a leading zero count value (dependent on a number of leading zeroes in the significand of the first operand), and a bias adjustment value (for adjusting the end result exponent so that it is biased according to the particular floating-point representation being used)

A second adder may add the sum value and carry value generated by the carry save adder to generate the exponent of the reciprocal estimate value. If the first operand is a subnormal floating-point value, then one of the carry save adder and the second adder may apply an adjustment, for example by modifying the bias adjustment value, or by asserting a carry input to the second adder. The values chosen for the inverted exponent value, leading zero count value and bias adjustment value may differ depending on whether recip estimate or rsqrt estimate is being performed. Nevertheless, for both types of reciprocal estimate operation, this approach allows the exponent to be calculated in relatively few processing cycles, for example two processing cycles, one for the carry save adder and one for the second adder. Also, the similar nature of the exponent generation for the recip and rsqrt estimate operations means a shared circuit comprising a single 3:2 carry save adder and a single second adder may be used, to save circuit area.

Having generated the reciprocal estimate value, some further processing circuitry may perform further processing using the reciprocal estimate value. For example the further processing may be a floating-point divide operation which uses an estimate of the reciprocal of the divisor as a starting point. Also, an M-bit reciprocal estimate value may be used by the further processing circuitry as a starting point for generating an N-bit value representing the full reciprocal of the first operand or reciprocal of the square root of first operand, where M<N. Hence, the reciprocal estimate operation may be useful for a number of operations.

Floating-Point Representation

Floating-point (FP) is a useful way of approximating real numbers using a small number of bits. The IEEE 754-2008 FP standard proposes multiple different formats for FP numbers. For example, three formats are binary 64 (also known as double precision, or DP), binary 32 (also known as single precision, or SP), and binary 16 (also known as half precision, or HP). The numbers 64, 32, and 16 refer to the number of bits required for each format.

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2. More precisely, FP numbers all consist of a sign bit, some number of biased exponent bits, and some number of fraction bits. For example, some floating-point formats include:

| Format    | sign | Exponent       | fraction      | exponent bias |
|-----------|------|----------------|---------------|---------------|
| DP [63:0] | 63   | 62:52 (11 bits)| 51:0 (52 bits)| 1023          |
| SP [31:0] | 31   | 30:23 (8 bits) | 22:0 (23 bits)| 127           |
| HP [15:0] | 15   | 14:10 (5 bits) | 9:0 (10 bits) | 15            |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$(-1)^{sign} \times 1.\text{fraction} \times 2^e$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal). Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| sign | 5-bit exponent | 10-bit fraction | 11-bit significand | value |
|------|----------------|-----------------|---------------------|-------|
| 0    | 01111          | 00_0000_0000    | 100_0000_0000       | $1.0 \times 2^0$ |
| 1    | 01110          | 10_0000_0000    | 110_0000_0000       | $-1.1 \times 2^{-1}$ |
| 0    | 00001          | 10_0000_0000    | 110_0000_0000       | $1.1 \times 2^{-14}$ |
| 0    | 00000          | 10_0000_0000    | 010_0000_0000       | $0.1 \times 2^{-14}$ |
| 1    | 11111          | 00_0000_0000    |                     | −infinity |
| 0    | 11111          | 00_1111_0011    |                     | NaN |

A large part of the complexity of FP implementation is due to subnormals, therefore they are often handled by microcode or software. However, by handling subnormals in hardware (as in the ARM® Cortex® processors provided by ARM Limited for example), speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001
−1=1001

In two's complement representation, an n-bit integer i is represented by the low order n bits of the binary n+1-bit value $2^n+i$, so a 4-bit two's complement integer would represent plus and minus one as:

+1=0001
−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Figure 1:
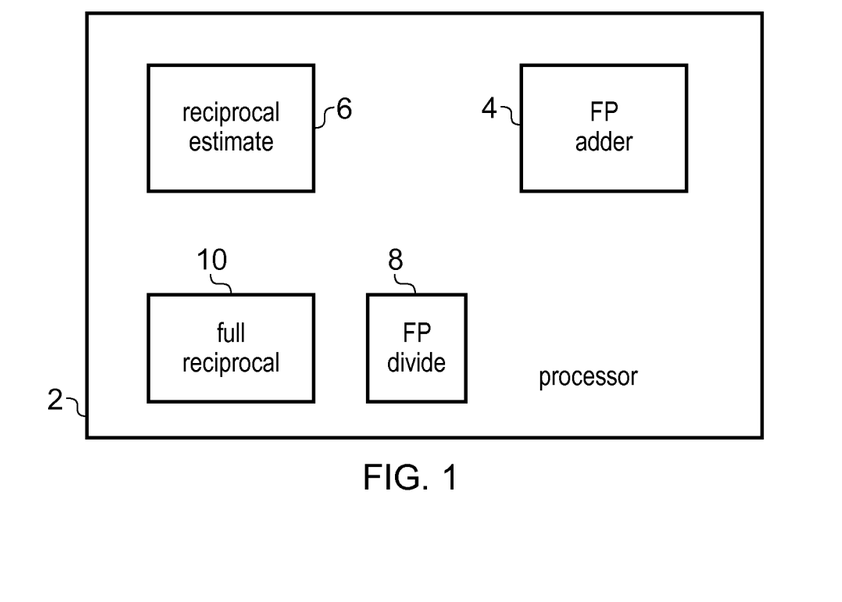
FIG. 1 illustrates an example of the data processing apparatus.

FIG. 1 shows an example of part of a data processing apparatus (e.g. a processor) 2 supporting FP arithmetic. The processor 2 includes a FP adder 4 for performing FP addition operations to add or subtract two FP operands to generate a result FP operand. Any known FP add unit design may be used for the FP adder. The processor 2 also has a separate reciprocal estimate unit 6 which is distinct from the FP adder 4, for generating a reciprocal estimate value representing the recip estimate or rsqrt estimate for an operand. Other processing units include a FP divide unit 8, which divides a first operand A by a divisor D to generate a result value, using a reciprocal estimate value representing the reciprocal of the divisor D as a starting point for the division. Similarly, a full reciprocal calculating unit 10 may use the reciprocal estimate value provided by the reciprocal estimate unit 6 as a starting point for calculating a reciprocal or reciprocal square root value with a greater number of bits than the reciprocal estimate. It will be appreciated that the data processing apparatus 2 may have many other units not shown in FIG. 1 for conciseness.

Figure 2:
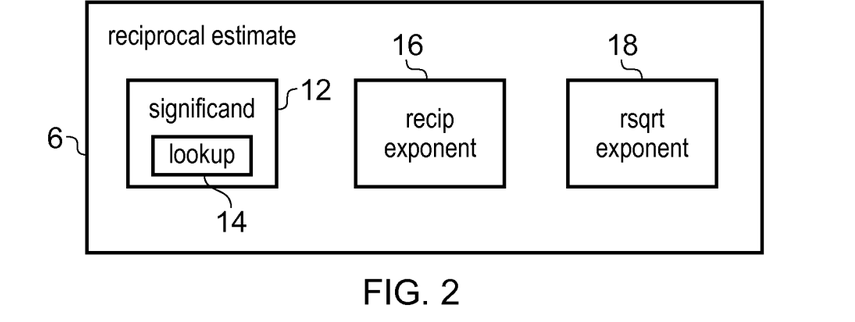
FIG. 2 illustrates an example of reciprocal estimation circuitry for performing a reciprocal estimation operation to generate a reciprocal estimate value.

FIG. 2 shows an example of the reciprocal estimate unit 6 in more detail. The reciprocal estimate unit 6 has significand generating circuitry 12 for generating a significand of the reciprocal estimate value. The significand generating circuitry 12 has one or more lookup tables 14 which store reciprocal estimate values for a range of input operands. There may be multiple lookup tables for different types of reciprocal estimates, for example one lookup table for recip estimates and one lookup table for rsqrt estimates.

Figure 8:
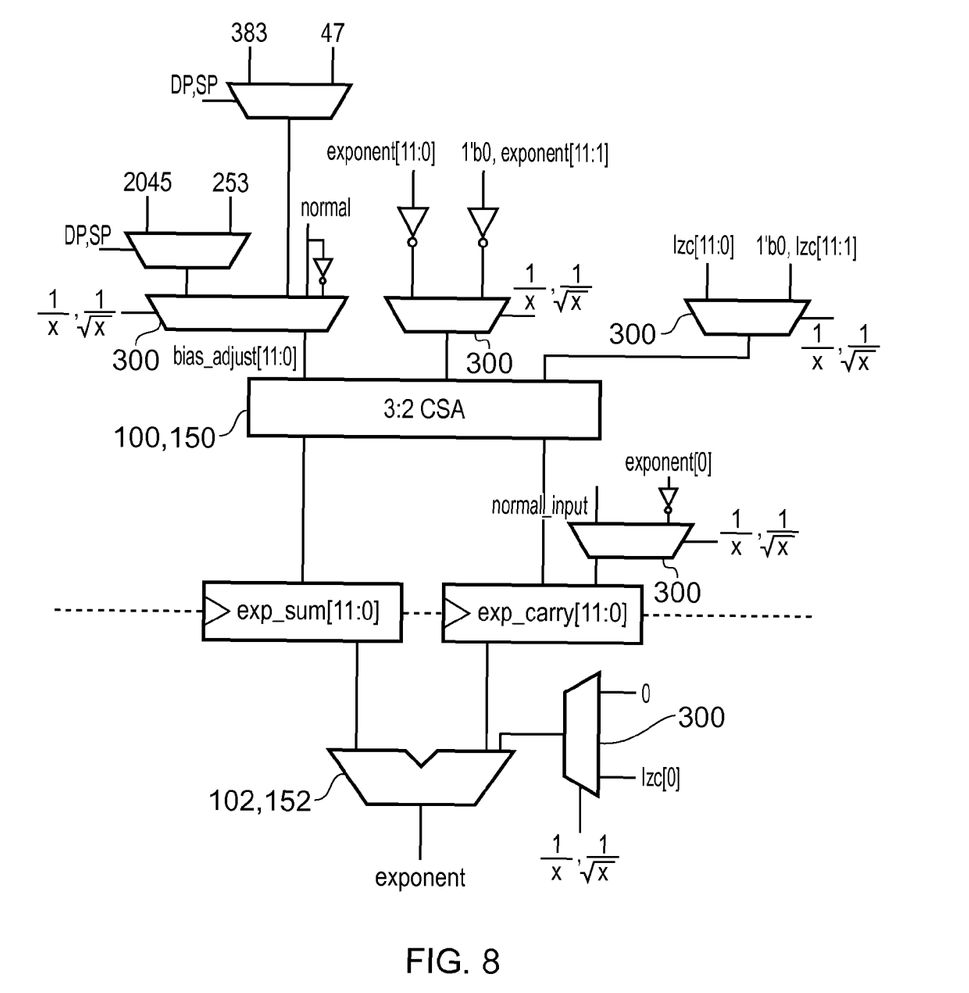
FIG. 8 shows an example of exponent generating circuitry which combines the two circuits of FIGS. 5 and 6.

The reciprocal estimate unit 6 may handle both fixed-point and floating-point (FP) operands. For the fixed-point operands, the significand generated by significand generating circuitry 12 is all that is required. For floating-point operands, an exponent is also needed, and so exponent generating circuitry 16, 18 may be provided. In this example, separate circuits 16, 18 are provided for calculating the exponent for recip and rsqrt calculations respectively. As shown in FIG. 8 however, other examples may have a single combined exponent generating circuitry for both types of calculation. Also, some embodiments may only support one of the recip and rsqrt calculations, in which case only one of circuits 16, 18 may be provided.

Figure 3:
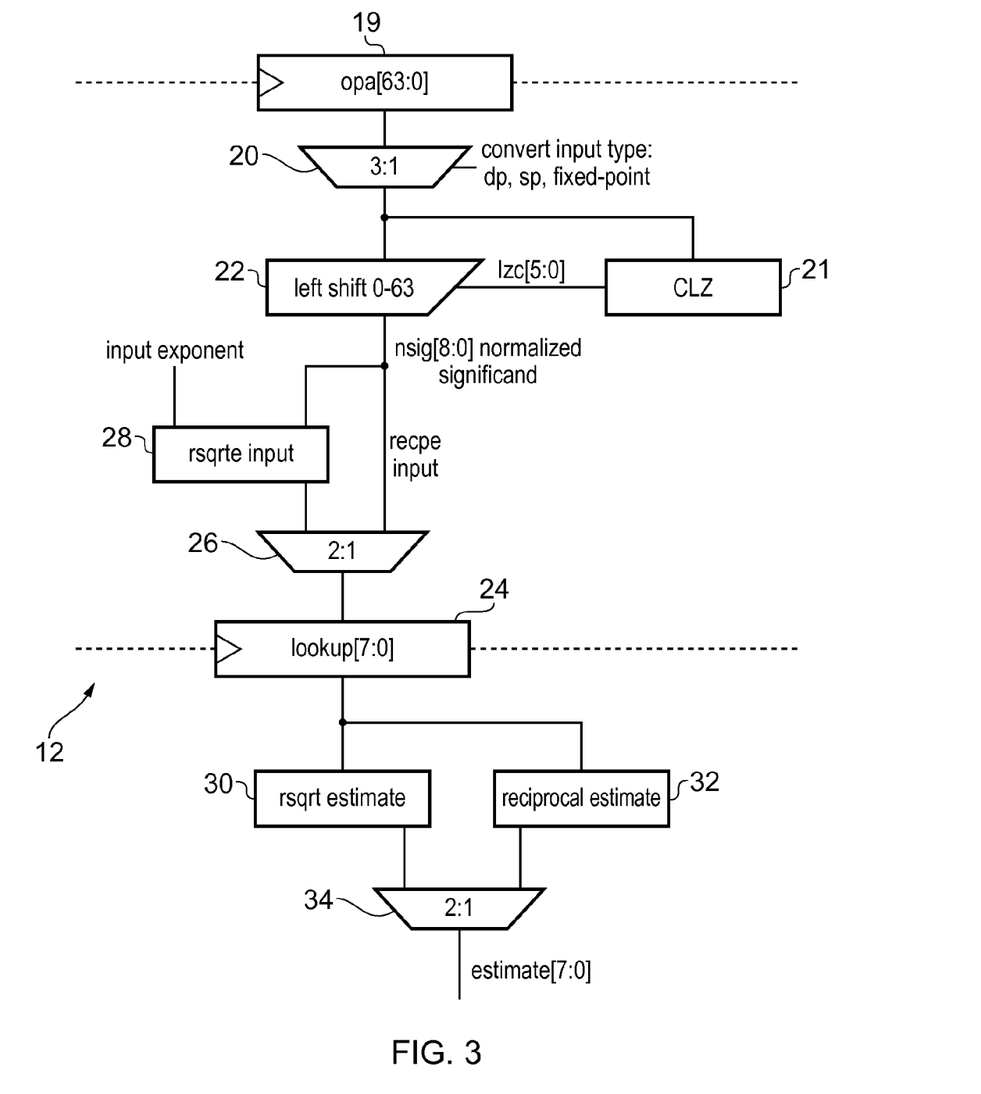
FIG. 3 shows an example of circuitry for generating a significand of the reciprocal estimate value.

FIG. 3 shows an example of the significand processing circuitry 12. A floating-point (FP) significand is constructed in the usual way from the floating-point value in input register 19 (leading bit set for nonzero exponents, fraction follows leading bit). A fixed-point significand is just the topmost 9 bits of the input. The instruction executed to trigger the reciprocal estimate operation specifies how to interpret the input. A multiplexer 20 is provided to convert the input type and provide the appropriate bits of the input register 19 downstream for subsequent processing.

Floating-point inputs are usually normal, but if subnormal (i.e. the exponent is zero) the significand is normalized. This is done by a leading zero counter 21 counting the leading zeros in the significand and then a left shifter 22 left shifting the significand by the detected number of zeroes, until the first '1' becomes the highest order bit. Normal floating-point operands and fixed-point operands are passed through the shifter 22 unchanged (although error checking may later verify that it is in the correct format). The top 9 bits out of the shifter, nsig[8:0], are passed on for further processing.

For recip estimates, the bottom 8 of these 9 bits [7:0] are used for the lookup index (we don't need the top bit because it is always 1). Hence, a lookup operand (lookup[7:0]) in register 24 is set equal to nsig[7:0].

For reciprocal square root estimates, a bit of computation is generated by lookup operand formatting circuitry 28. For fixed-point, we examine the top 2 bits nsig[8:7]:
    If nsig[8:7]=00, we set an overflow indicator and return all ones in the final answer
    If nsig[8:7]=01, lookup[7:0]={1'b0, nsig[6:0]}
    If nsig[8]=1, lookup[7:0]={1'b1, nsig[7:1]}
For FP, the bits used depend on the exponent
    If the biased exponent is odd, we lookup {1'b0, nsig[7:1]}
    If the biased exponent is even and nonzero, we lookup {1'b1, nsig[7:1]}
    If the biased exponent is zero, we lookup nsig[8:1]
These strange-looking rules are simply due to the fact that we want to compute square roots on even true exponents, and the parity of the true exponent is the opposite of the parity of the biased exponent.

The 8-bit lookup value lookup[7:0] is stored in register 24, and then used as an index into the recip estimate and rsqrt estimate tables 30, 32. Based on the instruction we return the appropriate 8-bit estimate (other embodiments may return different numbers of bits).

Figure 4:
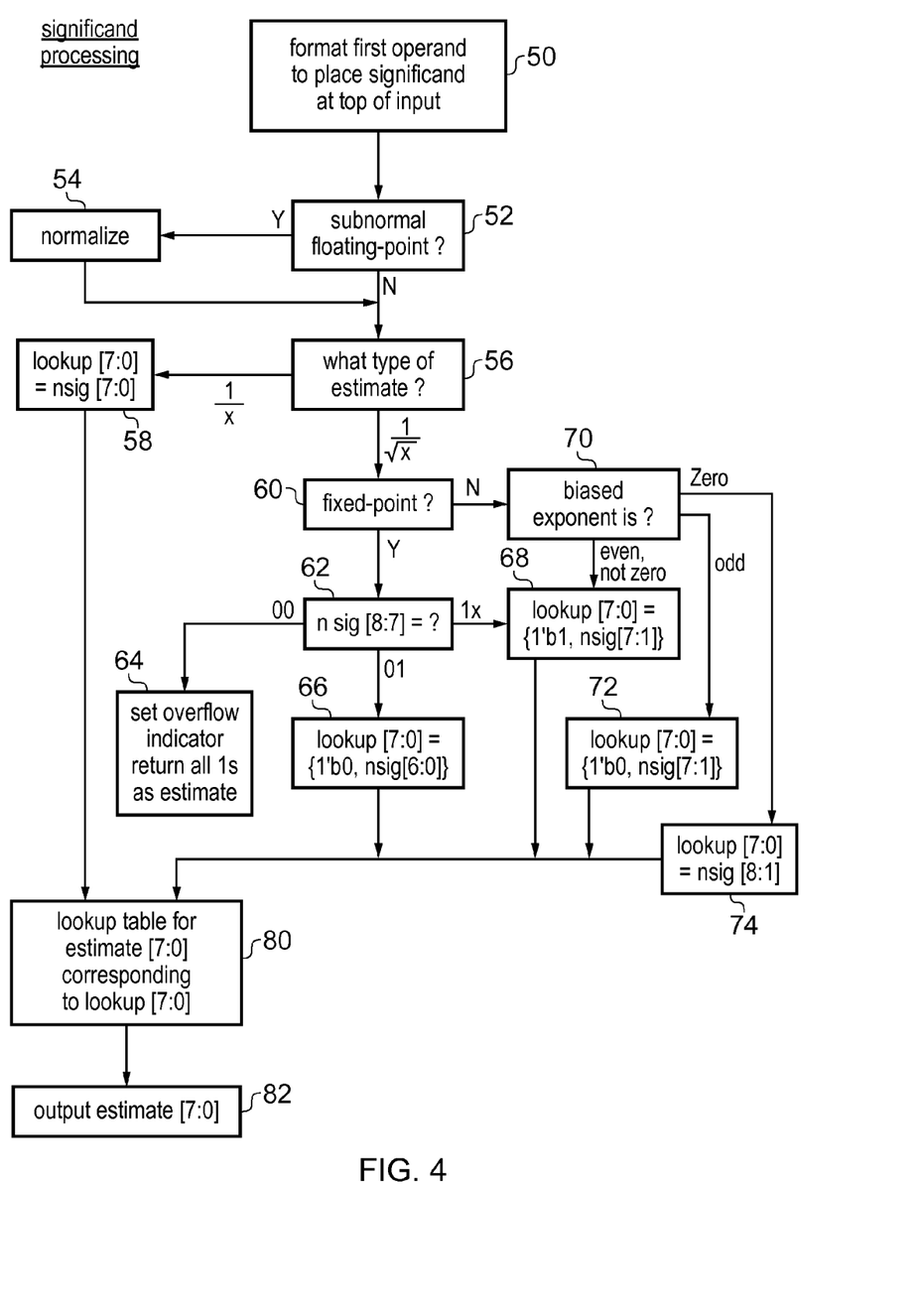
FIG. 4 is a flow diagram showing a method of generating the significand.

FIG. 4 is a flow diagram showing an example of the processing performed by the significand processing circuitry 12. At step 50 the multiplexer 20 formats the first operand to place the significand at the topmost bits of the input register 19. At step 52 it is determined whether the first operand is subnormal. If so, then at step 54 the subnormal value is normalized by counting the number of leading zeros in the significand of the first operand and left shifting by the counted number of bits. If the first operand is normal or a fixed-point operand then step 54 is omitted.

At step 56 it is determined what type of reciprocal estimate is being calculated. For a recip estimate, at step 58 the multiplexer 26 maps nsig[7:0] directly to lookup[7:0] and places these bits in register 24. For rsqrt estimate, at step 60 it is determined whether the first operand is a fixed-point operand. If so then at step 62 the lookup formatting circuitry 28 checks nsig[8:7]. If both bits are 0, then the estimate of the square root of the reciprocal will overflow and so the significand estimate[7:0] is returned=0b11111111, and an overflow indicator is set at step 64. If nsig[8:7]=01, then at step 66 the lookup operand is set such that bit [7]=0 and bits [6:0]=nsig[6:0]. If nsig[8]=1, then at step 68 the lookup operand 24 is set with bit [7]=1 and bits [6:0]=nsig[7:1].

On the other hand, if at step 60 the operand is a FP operand, then the biased exponent of the first operand is examined at step 70. If the biased exponent is non-zero and even (i.e. the true exponent is odd) then at step 68 the lookup operand is set in the same way as for fixed-point operands with nsig[8]=1. If the biased exponent is odd, then at step 72 the lookup operand is set with bit [7]=0 and bits [6:0]=nsig[7:1]. If the biased exponent is 0 then the first operand is subnormal, and at step 74 lookup bits [7:0] are set equal to nsig[8:1].

Regardless of how the lookup operand 24 is generated, at step 80 the lookup tables 30, 32 are indexed by the lookup operand 24. At step 82 the multiplexer 34 selects the output of table 30 for recip estimates and table 32 for rsqrt estimates, to return the significand of the reciprocal estimate, estimate[7:0].

For fixed-point operand, the significand is all that is required. However, with FP operands an exponent is also needed. Different calculations are used for the recip estimate and rsqrt estimate cases.

Recip Estimate Calculation (1/x)

Floating-point exponents are biased, i.e., the true exponent is obtained by subtracting a bias from the exponent that is packed into the FP number. Let e be the true exponent, e' the biased exponent, i.e. e=e'−bias. The reciprocal lookup table is expecting values in 0.5≤0.x<1, while normalized FP numbers are in the range 1≤1.x<2. In order to get the significand into the correct range we shift it right by one bit and adjust the exponent:

$$1.x*2^e = 0.1x*2^{(e+1)}$$

The "x" in the equation above represents the floating-point fraction. The reciprocal of 0.1x*2^(e+1) has exponent −(e+1). SP and DP numbers have different biases, but for simplicity let's take the SP bias of 127. Since we want a biased exponent, we'll actually return −(e+1)+127. With respect to our original, biased exponent e', we have:

$$-(e+1)+127 = -(e'-127+1)+127$$
$$= -(e'-126)+127$$
$$= -e'+126+127$$
$$= \sim e'+1+253$$
$$= \sim e'+254$$

So for SP, the new exponent is ~e'+254. For DP (bias 1023), the new exponent is ~e'+2046 (the notation ~e herein refers to the 2s complement of e, and the notation ~e refers to the inverse of e, i.e. −(0b011)=0b101 and ~(0b011)=0b100)

Subnormals complicate things. If the high order fraction bit is set, then we don't need to shift the significand right, but the bias equation is different (i.e., biased exponent one corresponds to true exponent −126, while biased exponent zero also corresponds to exponent −126). Since we compute the bias by subtracting 127, we need to add 1 to the exponent to correct for the bias. In other words, the computation ends up being the same for biased exponents zero (with high orderfraction bit set) and one.

if high-order fraction bit is not set, but the next fraction bit is, then the exponent is one too high when we put the number into the range [0.5.1). The true exponent if this number with fraction in the range [0.5.1) is −128

$$-(e)+127 = -(e'-127)+127$$
$$= -e'+127+127$$
$$= -e'+254$$
$$= \sim e'+1+254$$
$$= \sim e'+255$$

Generalizing to any number of leading zeros in the significand is as follows. We have already computed the number of leading zeros as lzc[5:0] using leading zero counter 21 in the significand processing circuitry 12. Adding in ls_lzc[5:0], which is only non-zero for subnormals:

let e be the true exponent of the normalized fraction
sub=subnormal=expa_zero_e1=1 bit indicating that the input is subnormal $$e = e'-127-ls\_lzc+sub$$

so for SP the exponent of the normalized reciprocal is $$-(e+1)+127 = -(e'-127-lzc+sub+1)+127$$
$$= -e'+127+lzc-sub-1+127$$
$$= -e'+254+lzc-sub-1$$
$$= \sim e'+1+254+lzc-sub-1$$
$$= \sim e'+254+lzc-sub$$
$$= \sim e'+253+lzc+\sim sub$$

for DP, the exponent of the normalized reciprocal is $$= \sim e'+2045+lzc+\sim sub$$

More generally, for any floating-point representation the biased exponent of the reciprocal estimate e'$_R$=~e'+2*bias−1+lzc+normal
where "bias" is the bias amount for that representation, and "normal" (equivalent to ~sub)=1 for normal values and =0 for subnormal values.

Figure 5:
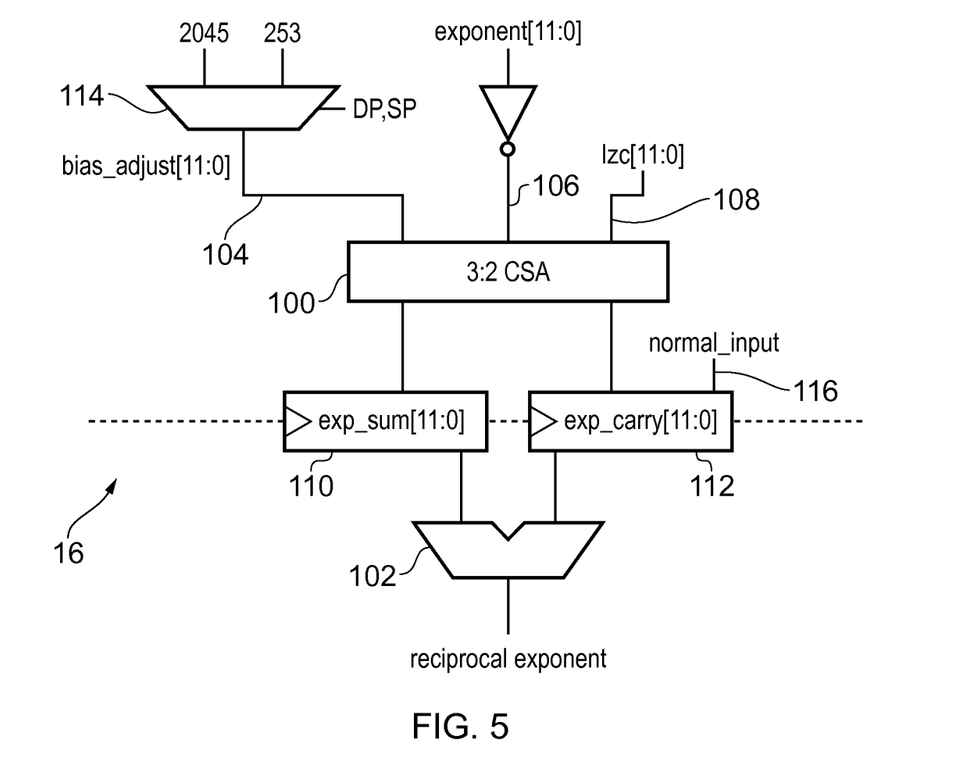
FIG. 5 shows an example of circuitry for generating an exponent of a reciprocal estimate value representing the reciprocal of an operand.

FIG. 5 shows an example of the circuitry 16 for calculating the exponent for recip estimates, having a 3:2 carry-save adder (CSA) 100 in a first processing stage and a second carry-propagate adder 102 in a second processing stage. The carry-save adder 100 adds a bias adjustment value 104, an inverted exponent 106 and a leading zero count value 108, to generate a sum value 110 and a carry value 112. The bias adjustment value is selected by a multiplexer 114 based on the FP format being used, and corresponds to 2*bias−1 in the equation above. Hence, the result of the carry save adder is effectively equal to ~e'+2*bias−1+lzc in carry-save form. At the second adder, the least significant bit of the carry value 112, which would otherwise be 0, is set equal to a normal input value 116 (=1 if the first operand is normal and =0 if subnormal). The sum and carry values 110, 112 are then added by second adder 102 to generate the biased exponent of the reciprocal estimate equivalent to the result of the equation above.

Rsqrt Exponent Calculation (1/√x)

For reciprocal square root exponents, the processing is a little different. For reciprocal square root estimates, we assume that the input is in the range 0.25≤0.x<1, which is a 1 or 2 bit shift from the normalized range of 1≤1.x<2. The reason for this shift is that we need the exponent to be even in order to easily compute the square root, and we need the significand to be in the specified range in order for the lookup table to be correct. In summary, we need an even exponent and a significand that is 0.1xxx or 0.01xxx Even exponent=>0.01xxx is an even exponent
Odd exponent=>0.1xxx is an even exponent As in the previous section let e be the true exponent, e' the biased exponent. For SP e=e'−127
e' even=>e is odd=>right shift significand by 1 and new exponent is e+1
=>true exponent after lookup is −(e+1)/2
e' odd=>e is even=>right shift significand by 2 and new exponent is e+2
=>true exponent after lookup is −(e+2)/2

Now $-(e+1)/2=-(e'-127+1)/2=(-e'+126)/2=(-e'+127)/2$

And $-(e+2)/2=-(e'-127+2)/2=(-e'+125)/2=(-e'+126)/2$

The returned exponent has to be rebiased (add 127), which gives returned exponent=190+~e'>>1+~e'[0]=190+e'[11:1]+~e'[0]

For subnormal square root estimates, we also need to account for lzc[5:0] of the significand (lzc is zero for normal numbers).

e' even and nonzero, lzc=0=>e is odd, so right shift the significand by 1, new_e=e+1=e'−126 e' odd, lzc=0=>e is even, so right shift the significand by 2, new_e=e+2=e'−125 for e'=0, we have to deal with the subnormal boundary (e is still −126), plus the leading zero count of the significand, giving us the biased exponent of inverse square root: 189+lzc[0]+lzc[5:1]

Combining the normal and subnormal equations (one of e' and lzc are always zero), the biased exponent of inverse square root is (SP):

190−sub+~e'[0]+e'[11:1]+lzc[0]+lzc[5:1]=189+normal+~e'[0]+~e'[11:1]+lzc[0]+lzc[5:1]

For DP the biased exponent of the inverse square root is:

=1533+normal+~e'[0]+~e'[11:1]+lzc[0]+lzc[5:1]

In general, this works out to:

=bias+(bias−1)/2−1+normal+e'/2+~e'[0]+lzc/2+lzc[0]

Again this may seem like a lot a computation, but as shown in FIG. 6 this can again be implemented using circuitry 18 comprising a 3:2 carry save adder 150 and a second carry-propagate adder 152. Again, the carry save adder 150 adds a bias adjustment value 154, inverted exponent value 156 and a leading zero count value 158. However, in this example the bias exponent value 154 is adjusted based on the normal value indicating whether the first operand is normal or subnormal. Bits [11:2] of the bias adjustment value are selected by a multiplexer 160 based on the FP format, while bits [1:0] of the bias adjustment value are 0b10 if the first operand is normal and 0b01 if the first operand is subnormal. Hence, the bias adjustment value [11:0] represents the "bias+(bias−1)/2−1+normal" term in the equation above. The inverted exponent value 156 is equivalent to right-shifting the exponent by one place and inverting, i.e. ~e'/2. Similarly the leading zero count value 158 is equivalent to a 12-bit value of the leading zero count right shifted by one place, i.e. lzc/2 in the equation above. Hence, the result of carry-save adder 158 corresponds to bias+(bias−1)/2−1+normal+~e'/2+lzc/2, which leaves only the ~e'[0] and lzc[0] terms. ~e'[0] is inserted into bit [0] of the carry value 164, which otherwise would be 0. lzc[0] is applied to the carry input 168 of the second adder 152. Hence, the result of the second adder 152 is equivalent to the biased exponent calculated with the equation above. Again, this fits into two processing cycles, one for the first addition and one for the second.

Figure 6:
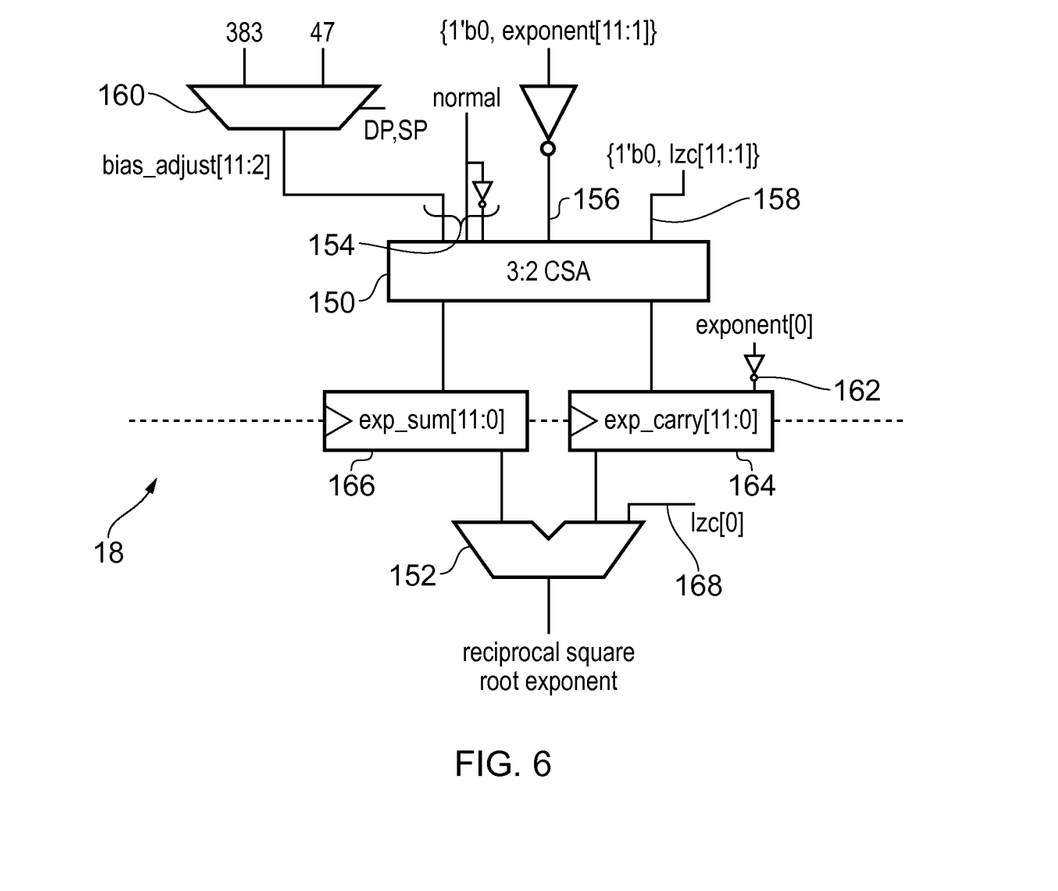
FIG. 6 shows an example of circuitry for generating an exponent of a reciprocal estimate value representing the reciprocal of the square root of an operand.
Figure 7:
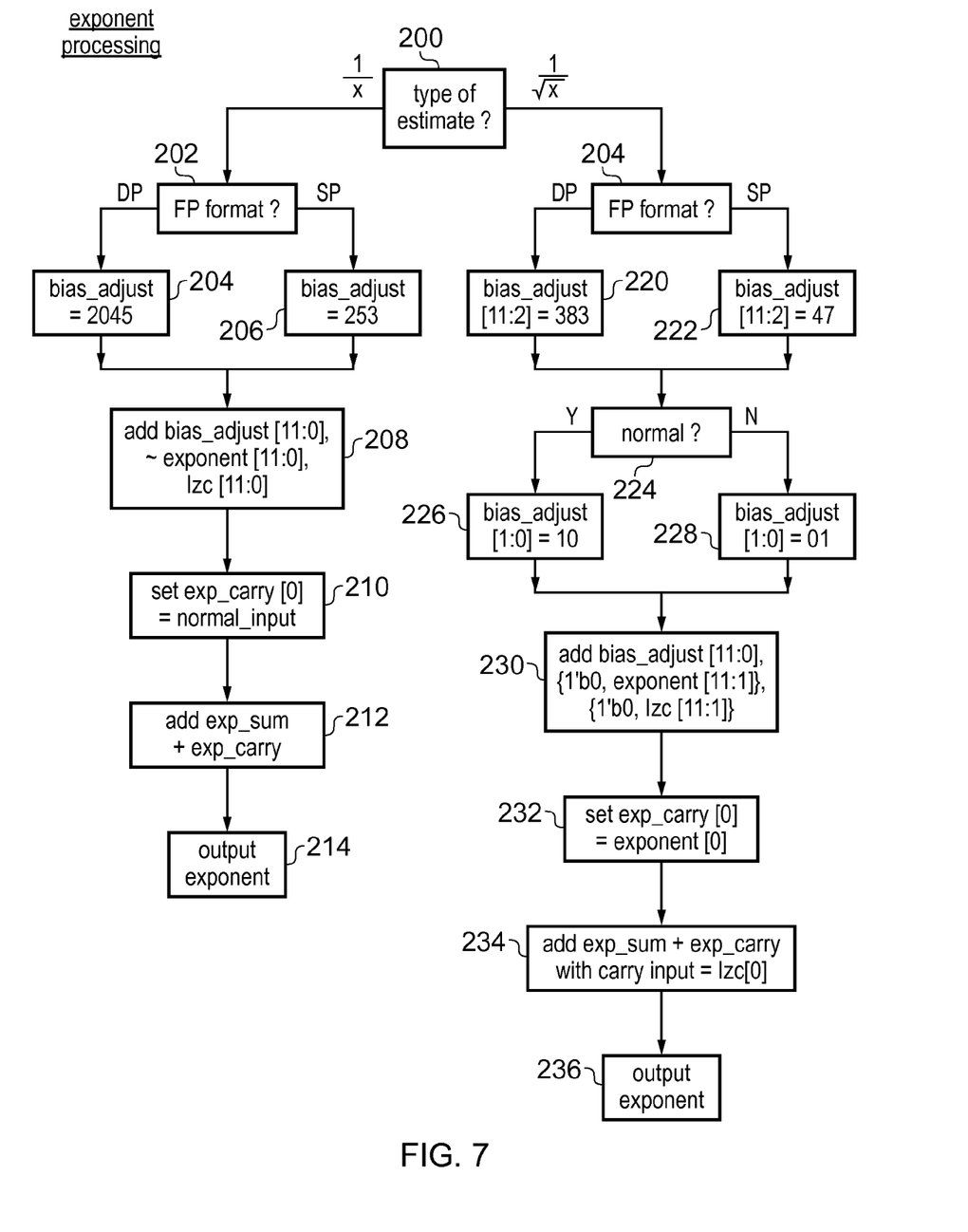
FIG. 7 is a flow diagram showing a method of generating the exponent.

FIG. 7 is a flow diagram illustrating the processing of the circuits to FIGS. 5 and 6. At step 200 it is determined which type of estimate is performed. For recip estimates, at step 202 the FP format is determined. For double precision, the multiplexer 114 selects the bias adjustment value of 2045 at step 204. For single precision the bias adjustment value of 253 is selected (step 206). At step 208, the carry-save adder 100 adds the bias adjustment value 104, the inverted version of the biased exponent of the first operand 106 and the leading zero count value 108, to generate sum and carry values 110, 112. The leading zero count value 108 will be zero if the first operand is normal. At step 210 the least significant bit of the carry value 112 is set equal to the normal input value 116, i.e. 1 if the first operand is normal and 0 if subnormal. At step 212 the sum and carry values 110, 112 are added by second adder 102 and at step 214 the second adder outputs the exponent of the recip estimate value.

On the other hand for reciprocal square root estimation, at step 204 the FP format is determined. If the format is double precision then at step 220 the upper 10 bits of the bias adjustment value are set equal to decimal 383 (i.e. binary 0b01_0111_1111). For single precision, at step 222 the upper 10 bits of the bias adjustment value 154 are set equal to decimal 47 (i.e. binary 0b00_0010_1111). At step 224 it is determined whether the first operand is normal or subnormal. If normal then bits[1:0] of the bias adjustment value 154 are set to 0b10 at step 226 and if subnormal at step 228 bits [1:0]=0b01. Hence, depending on whether the operand is normal or subnormal and in single or double precision, the bias adjustment value 124 can take the following values:

DP, normal: 0b0101_1111_1110
DP, subnormal: 0b0101_1111_1101
SP, normal: 0b0000_1011_1110
SP, subnormal: 0b0000_1011_1101

At step 230 the carry save adder 150 adds the bias adjustment value 154, an inverter exponent value 156 corresponding to inverting half the biased exponent of the first operand, and a leading zero count value 158 which corresponds to half the number of leading zeros in the significand of the first operand. The carry save adder generates a sum value 166 and carry value 164. At step 232 the least significant bit of the carry value 164 is set equal to the least significant bit of the biased exponent of the first operand. At step 234 the second adder 152 then adds the sum and carry values 166, 164 with the carry input of the second adder 152 set equal to the least significant bit of the leading zero count value 168. At step 236 the second adder 152 then outputs the exponent of the rsqrt estimate value.

While FIGS. 5 and 6 show separate circuits 16, 18 for calculating the exponents in the recip and rsqrt cases respectively, in other embodiments these may be combined into a single circuit such as the example shown in FIG. 8. Since both the circuits 16, 18 include a carry save adder 100, 150 and a carry propagate adder 102, 152, these can be shared, with multiplexers 300 provided to select between the appropriate input values for each adder as shown in FIG. 8. Otherwise, the operation of FIG. 8 is the same as shown in FIG. 7.

Hence in summary, by providing a dedicated unit for performing reciprocal estimate operations which is separate from a FP adder, both reciprocal estimate and FP add operations can be made faster.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   floating-point add circuitry to perform a floating-point addition operation for adding or subtracting two floating-point operands to generate a result floating-point operand; and
   reciprocal estimation circuitry to perform a reciprocal estimation operation on a first operand to generate a reciprocal estimate value representing an estimate of a reciprocal of the first operand or an estimate of a reciprocal of the square root of the first operand;
   wherein the reciprocal estimation circuitry is physically distinct from the floating-point add circuitry;
   wherein the reciprocal estimation circuitry comprises exponent processing circuitry to generate an exponent of the reciprocal estimate value if the first operand is a floating-point operand; and
   the exponent processing circuitry comprises:
   a carry-save adder to add an inverted exponent value, a leading zero count value, and a bias adjustment value, to generate a sum value and carry value, wherein:
   the inverted exponent value corresponds to an inverted version of the exponent of the first operand;
   the leading zero count value is dependent on a number of leading zeroes in a significand of the first operand; and
   the bias adjustment value is for biasing the exponent of the reciprocal estimate value according to a floating-point representation used for the reciprocal estimate value; and
   a second adder to add the sum value and carry value generated by the carry-save adder to generate the exponent of the reciprocal estimate value.

2. The data processing apparatus according to claim 1, wherein the floating-point add circuitry is capable of performing the floating-point addition operation in M processing cycles, and the reciprocal estimation circuitry is capable of performing the reciprocal estimation operation in N processing cycles, where N<M.

3. The data processing apparatus according to claim 1, wherein the first operand is one of:
   a fixed-point operand comprising a fixed-point significand; and
   a floating-point operand comprising a floating-point significand and an exponent.

4. The data processing apparatus according to claim 1, wherein the reciprocal estimation circuitry is capable of performing the reciprocal estimation operation on both fixed-point operands and floating-point operands.

5. The data processing apparatus according to claim 1, wherein the reciprocal estimation circuitry is capable of performing the reciprocal estimation operation on both normal floating-point operands and subnormal floating-point operands.

6. The data processing apparatus according to claim 1, wherein the reciprocal estimation circuitry comprises significand processing circuitry to generate a significand of the reciprocal estimate value.

7. The data processing apparatus according to claim 6, wherein the significand processing circuitry comprises:
   lookup operand generating circuitry to generate a lookup operand based on a significand of the first operand; and
   a lookup table to map the lookup operand generated by the lookup operand generating circuitry to the significand of the reciprocal estimate value.

8. The data processing apparatus according to claim 7, wherein the lookup operand generating circuitry comprises normalization circuitry to normalize the significand of the first operand if the first operand is a subnormal floating-point operand.

9. The data processing apparatus according to claim 1, wherein the exponent processing circuitry comprises:
   reciprocal exponent generation circuitry to generate the exponent of the reciprocal estimate value if the reciprocal estimate value represents the estimate of the reciprocal of the first operand; and
   reciprocal square root exponent generation circuitry to generate the exponent of the reciprocal estimate value if the reciprocal estimate value represents the estimate of the reciprocal of the square root of the first operand.

10. The data processing apparatus according to claim 9, wherein at least some circuitry is shared between the reciprocal exponent generation circuitry and the reciprocal square root exponent generation circuitry.

11. The data processing apparatus according to claim 1, wherein if the reciprocal estimate value represents the estimate of the reciprocal of the first operand, then the exponent processing circuitry is configured to generate a biased exponent e'R of the reciprocal estimate value with a value equivalent to $e'_R = e'_{op} + 2*B - 1 + lzc + normal$; where:
   $\sim e'_{op}$ is an inverted version of a biased exponent $e'_{op}$ of the first operand;
   B is an exponent bias amount;
   lzc represents a number of leading zeroes in a significand of the first operand if the first operand is subnormal; and
   normal equals 1 if the first operand is normal and equals 0 if the first operand is subnormal.

12. The data processing apparatus according to claim 1, wherein if the reciprocal estimate value represents the estimate of the reciprocal of the square root of the first operand, then the exponent processing circuitry is configured to generate a biased exponent e'R of the reciprocal estimate value with a value equivalent to:

$$e'_R = B + \frac{B-1}{2} - 1 + \text{normal} + \sim\frac{e'_{op}}{2} + \sim e'_{op}[0] + \frac{lzc}{2} + lzc[0];$$

where:

$$\sim\frac{e'_{op}}{2}$$

is an inverted version of half a biased exponent $e'_{op}$ of the first operand;
$\sim e'_{op}[0]$ is an inverted version of a least significant bit of the biased exponent $e'_{op}$ of the first operand;
B is an exponent bias amount;

lzc represents a number of leading zeroes in a significand of the first operand if the first operand is subnormal;

lzc[0] is a least significant bit of lzc; and normal equals 1 if the first operand is normal and equals 0 if the first operand is subnormal.

13. The data processing apparatus according to claim 1, wherein one of the carry-save adder and the second adder is configured to selectively apply an adjustment depending on whether the first operand is a normal floating-point operand or a subnormal floating-point operand.

14. The data processing apparatus according to claim 1, comprising further processing circuitry to perform further processing using the reciprocal estimate value generated by the reciprocal estimation circuitry.

15. The data processing apparatus according to claim 14, wherein the further processing comprises generating a full reciprocal value representing the reciprocal of the first operand or the reciprocal of the square root of the first operand, wherein the reciprocal estimate value comprises fewer bits than the full reciprocal value and the further processing uses the reciprocal estimate value as an initial value in a process for obtaining the full reciprocal value.

16. A data processing apparatus comprising:

floating-point adding means for performing a floating-point addition operation for adding or subtracting two floating-point operands to generate a result floating-point operand; and reciprocal estimation means for performing a reciprocal estimation operation on a first operand to generate a reciprocal estimate value representing an estimate of a reciprocal of the first operand or an estimate of a reciprocal of the square root of the first operand;

wherein the reciprocal estimation means is physically distinct from the floating-point adding means;

wherein the reciprocal estimation means comprises means for generating an exponent of the reciprocal estimate value if the first operand is a floating-point operand; and the means for generating the exponent comprises:

means for carry-save adding an inverted exponent value, a leading zero count value, and a bias adjustment value, to generate a sum value and carry value, wherein:

the inverted exponent value corresponds to an inverted version of the exponent of the first operand;

the leading zero count value is dependent on a number of leading zeroes in a significand of the first operand; and the bias adjustment value is for biasing the exponent of the reciprocal estimate value according to a floating-point representation used for the reciprocal estimate value; and means for adding the sum value and carry value generated by the means for carry-save adding to generate the exponent of the reciprocal estimate value.

17. A data processing method comprising:

performing a reciprocal estimation operation on a first operand to generate a reciprocal estimate value representing an estimate of a reciprocal of the first operand or an estimate of a reciprocal of the square root of the first operand;

wherein the reciprocal estimation operation is performed using reciprocal estimation circuitry which is physically distinct from floating-point add circuitry for performing a floating-point addition operation for adding or subtracting two floating-point operands to generate a result floating-point operand;

wherein the reciprocal estimation operation includes:

generating an exponent of the reciprocal estimate value if the first operand is a floating-point operand; and adding an inverted exponent value, a leading zero count value, and a bias adjustment value, to generate a sum value and carry value, wherein:

the inverted exponent value corresponds to an inverted version of the exponent of the first operand;

the leading zero count value is dependent on a number of leading zeroes in a significand of the first operand; and the bias adjustment value is for biasing the exponent of the reciprocal estimate value according to a floating-point representation used for the reciprocal estimate value; and adding the sum value and the carry value to generate the exponent of the reciprocal estimate value.

\* \* \* \* \*